US008295849B2

(12) United States Patent
Moon et al.

(10) Patent No.: US 8,295,849 B2
(45) Date of Patent: Oct. 23, 2012

(54) APPARATUS AND METHOD FOR CIRCUIT MODE RESOURCE ALLOCATION IN A BROADBAND WIRELESS COMMUNICATION SYSTEM

(75) Inventors: June Moon, Seoul (KR); Soon-Young Yoon, Seoul (KR); Jae-Hee Cho, Seoul (KR); Jae-Woo So, Buchen-si (KR); In-Seok Hwang, Seoul (KR); Kwan-Hee Roh, Hwaseong-si (KR); Hee-Kwun Cho, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 12/313,813

(22) Filed: Nov. 25, 2008

(65) Prior Publication Data
US 2009/0135779 A1    May 28, 2009

(30) Foreign Application Priority Data
Nov. 26, 2007    (KR) .................... 10-2007-0120957

(51) Int. Cl.
*H04W 72/00*    (2009.01)

(52) U.S. Cl. ...................................................... 455/450
(58) Field of Classification Search .................. 455/450
See application file for complete search history.

(56) References Cited

U.S. PATENT DOCUMENTS

| 2007/0047432 A1* | 3/2007 | Cho et al. ....................... 370/203 |
| 2007/0189197 A1* | 8/2007 | Kwon et al. ................... 370/319 |
| 2008/0045272 A1* | 2/2008 | Wang et al. .................... 455/561 |
| 2008/0159220 A1* | 7/2008 | Kitchin et al. ................ 370/329 |
| 2008/0165744 A1* | 7/2008 | Forssell ........................ 370/336 |
| 2009/0075667 A1* | 3/2009 | Bourlas ....................... 455/452.1 |
| 2009/0103500 A1* | 4/2009 | Malkamaki et al. .......... 370/336 |
| 2010/0015914 A1* | 1/2010 | Li et al. ............................ 455/7 |
| 2010/0177717 A1* | 7/2010 | Sung et al. .................... 370/329 |
| 2010/0215004 A1* | 8/2010 | Yoo .............................. 370/329 |

* cited by examiner

*Primary Examiner* — Nathan Mitchell

(57) ABSTRACT

A broadband wireless communication system using a fixed allocation scheme is provided. The system includes a controller for configuring change report information to report occurrences of resource release or change when resources are released or changed in a fixed allocation region, a generator for generating a fixed allocation Information Element (IE) including the change report information and history information regarding the resource release or change, and a transmitter for transmitting the fixed allocation IE.

30 Claims, 10 Drawing Sheets

FIG.1A
(PRIOR ART)
FIG.1B
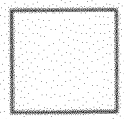 : UNALLOCATED SLOT    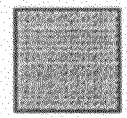 : ALLOCATED SLOT
(PRIOR ART)

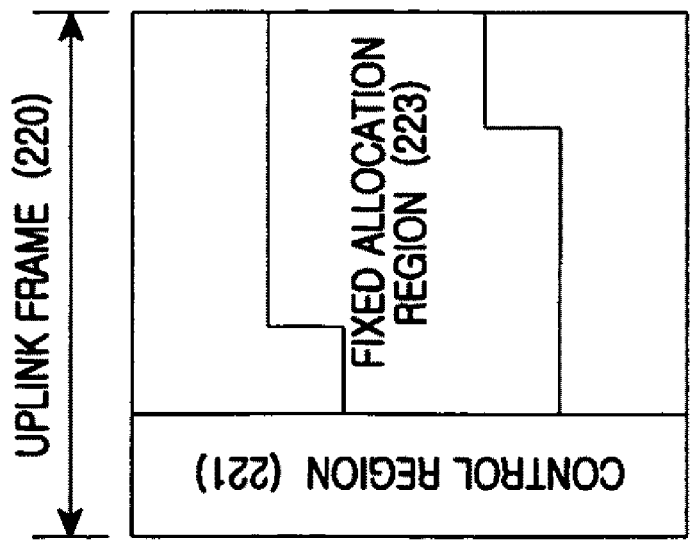
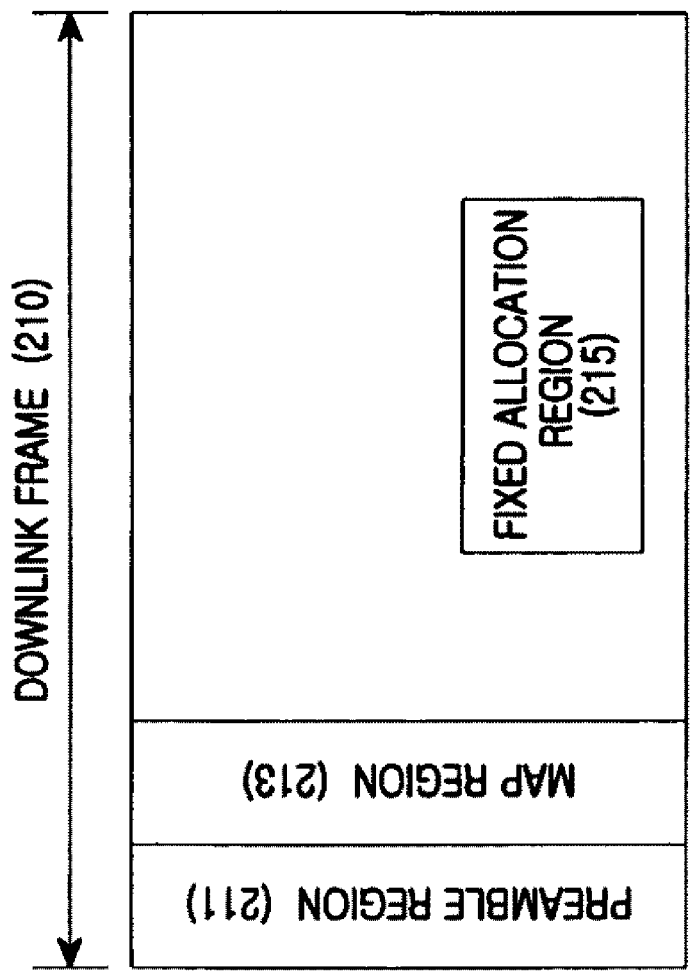
FIG.2

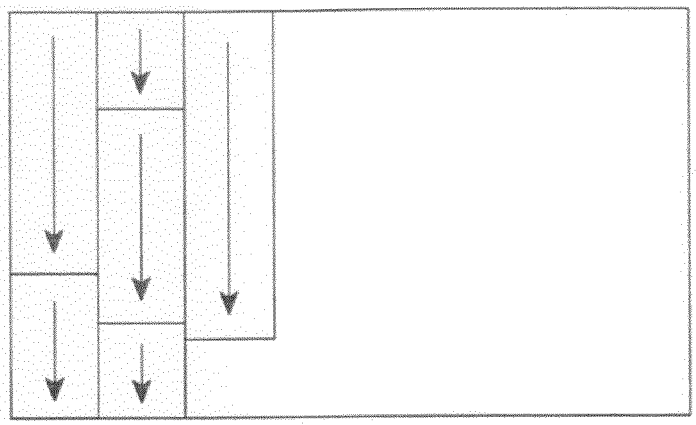
FIG.3A
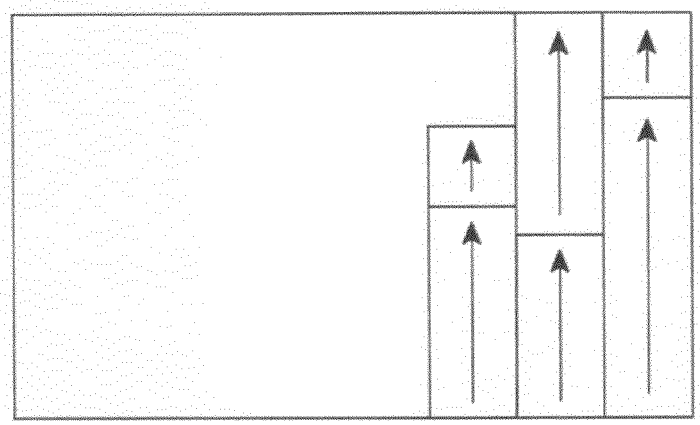
FIG.3B
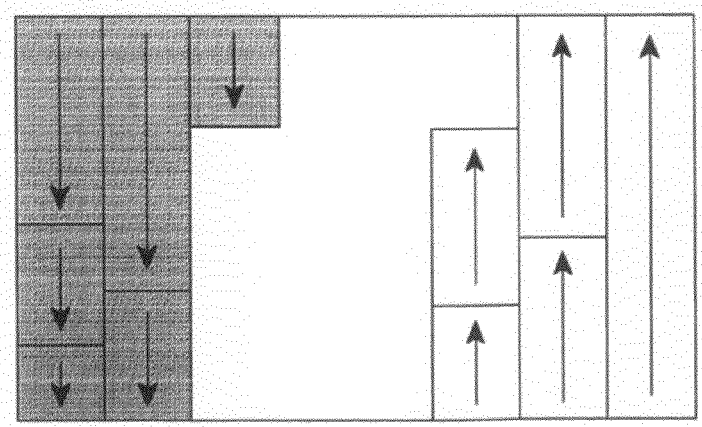
FIG.3C
 : FIXED ALLOCATION  : GENERAL ALLOCATION

APPARATUS AND METHOD FOR CIRCUIT MODE RESOURCE ALLOCATION IN A BROADBAND WIRELESS COMMUNICATION SYSTEM

CROSS-REFERENCE TO RELATED APPLICATION (S) AND CLAIM OF PRIORITY

The present application claims the benefit under 35 U.S.C. §119(a) of a Korean patent application filed in the Korean Intellectual Property Office on Nov. 26, 2007 and assigned Serial No. 10-2007-0120957, the entire disclosure of which is hereby incorporated by reference.

TECHNICAL FIELD OF THE INVENTION

The present invention relates to a broadband wireless communication system. More particularly, the present invention relates to an apparatus and method for self-recoverable fixed allocation in a broadband wireless communication system.

BACKGROUND OF THE INVENTION

In the next generation communication system, also known as the 4$^{th}$ Generation (4G) communication system, research is actively in progress to provide a Quality of Service (QoS) with a data transfer speed of about 100 Mbps. In particular, the 4 G communication system is currently being developed to ensure mobility and QoS in a Broadband Wireless Access (BWA) communication system, such as a Wireless Local Area Network (WLAN) system and a Wireless Metropolitan Area Network (WMAN) system. A representative example of such a communication system is an Institute of Electrical and Electronics Engineers (IEEE) 802.16 communication system.

In the 802.16 system, a base station (BS) and a mobile station (MS) perform communication in a physical frame unit. The BS transmits a resource allocation message in every frame. By using the resource allocation message, the MS can know resources allocated to the MS within a frame. In this case, if there is an MS for receiving a service of which traffic is generated periodically or continuously, an unnecessary overhead is produced when resource allocation information is reported using the resource allocation message in every frame. To solve this problem, a scheme for fixedly allocating resources of a specific region in every frame is being considered, and this scheme is referred to as a fixed resource allocation scheme. That is, resources allocated using the fixed allocation scheme are used until the resources are changed or released.

In general, when using the fixed allocation scheme, radio resources are one-dimensionally represented. In other words, resources allocated to each of MSs are represented with a start-point offset and a duration. For example, if resources are allocated to five MSs according to the fixed allocation scheme, the resources are occupied as shown in FIG. 1A. Referring to FIG. 1A, slots 0 to 5 are allocated to an MS A, slots 6 to 9 are allocated to an MS B, slots 10 to 11 are allocated to an MS C, slots 12 to 17 are allocated to an MS D, slots 18 to 20 are allocated to an MS E, and slots 21 to 31 are unallocated.

If radio resources allocated to the MS C are released in a state of FIG. 1A, that is, if the slots 10 to 11 are released, locations of the slots allocated to the MS D and the MS E are implicitly changed as shown in FIG. 1B in order to prevent overall resources from being discontinuously allocated. That is, upon recognizing the release of the resources allocated to the MS C, the MS D and the MS E determine that the locations of the slots allocated to the MS D and the MS E are changed without receiving an additional message. Therefore, if a first MS allocated with resources according to the fixed allocation scheme cannot recognize the release of radio resources allocated to a second MS allocated with resources located prior to those of the first MS (for example, if the resource allocation message is not successfully received), the first MS operates abnormally. For example, if the MS D cannot recognize the release of the radio resources allocated to the MS C, the MS D attempts to receive a signal mapped to the slots 12 to 17. However, in this case, the BS transmits the signal to the MS D through the slots 10 to 15. Accordingly, the MS D cannot correctly receive the signal transmitted to the MS D, and as a result, a Cyclic Redundancy Check (CRC) error occurs. In a downlink scenario, when the release of the radio resources is not recognized, it affects only an MS that cannot recognize release of radio resources allocated to another MS. However, in an uplink scenario, other MSs are also affected. For example, if the MS D transmits a signal by mapping the signal onto the slots 12 to 17, collision occurs with a signal transmitted by the MS E and mapped onto the slots 16 to 17.

As described above, when the fixed allocation scheme is used in an implicit resource shifting scheme, if an MS unsuccessfully receives a resource allocation message, a resource allocation information disparity may occur between the MS and the BS. Accordingly, there is a need for a method of overcoming the resource allocation information disparity resulting from an unsuccessful reception of the resource allocation message.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for overcoming a resource allocation information disparity between a base station (BS) and a mobile station (MS) when a fixed allocation scheme is used in a broadband wireless communication system.

Another aspect of the present invention is to provide an apparatus and method for recognizing changes in a resource allocation state after a MAP message is unsuccessfully received by an MS to which resources are allocated using a fixed allocation scheme in a broadband wireless communication system.

Another aspect of the present invention is to provide an apparatus and method for self-recovering resource allocation information after a MAP message is unsuccessfully received by an MS to which resources are allocated using a fixed allocation scheme in a broadband wireless communication system.

In accordance with an aspect of the present invention, a BS apparatus in a broadband wireless communication system using a fixed allocation scheme is provided. The apparatus includes a controller for configuring change report information to report occurrence of resource release or change when resources are released or changed in a fixed allocation region, a generator for generating a fixed allocation Information Element (IE) including the change report information and history information regarding the resource release or change, and a transmitter for transmitting the fixed allocation IE.

In accordance with another aspect of the present invention, an MS apparatus in a broadband wireless communication system using a fixed allocation scheme is provided. The apparatus includes a receiver for receiving a fixed allocation IE, an analyzer for evaluating change report information included in the fixed allocation IE, and a controller for determining a presence/absence of history information regarding unconsidered resource release or change according to the change report information and for recovering allocation state information of a fixed allocation region by using the history information.

In accordance with another aspect of the present invention, a method of operating a BS apparatus in a broadband wireless communication system using a fixed allocation scheme is provided. The method includes configuring change report information to report occurrence of resource release or change when resources are released or changed in a fixed allocation region, generating a fixed allocation IE including the change report information and history information regarding the resource release or change, and transmitting the fixed allocation IE.

In accordance with another aspect of the present invention, a method of operating an MS apparatus in a broadband wireless communication system using a fixed allocation scheme is provided. The method includes receiving a fixed allocation IE, determining change report information included in the fixed allocation IE, determining a presence/absence of history information regarding unconsidered resource release or change according to the change report information, and recovering allocation state information of a fixed allocation region by using the history information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 1A and 1B illustrate examples of resource allocation according to a fixed allocation scheme in a broadband wireless communication system;

FIG. 2 illustrates an example of a frame structure in a broadband wireless communication system;

FIGS. 3A to 3C illustrate examples of using resources of a fixed allocation region in a broadband wireless communication system;

FIGS. 4A to 4D illustrate examples of resource allocation according to a fixed allocation scheme in a broadband wireless communication system according to an exemplary embodiment of the present invention;

DETAILED DESCRIPTION OF THE INVENTION

Figure 5:
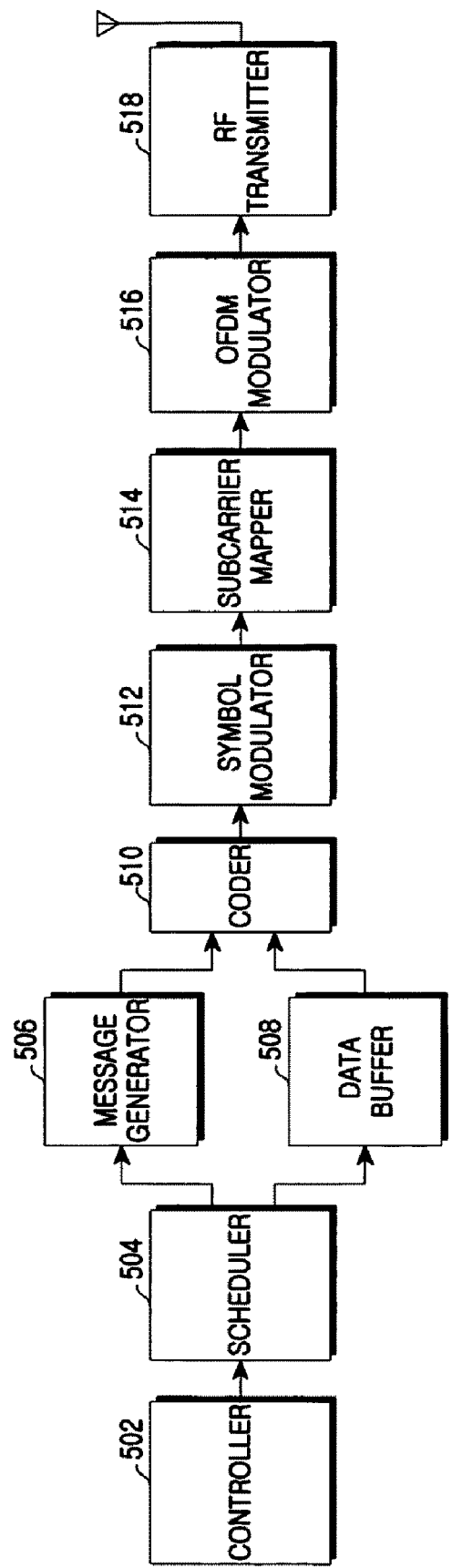
FIG. 5 is a block diagram of a base station (BS) in a broadband wireless communication system according to an exemplary embodiment of the present invention.

FIGS. 2 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A technique to be described hereinafter relates to a method for self-recovering allocation state information after a mobile station (MS) unsuccessfully receives a MAP message according to a fixed allocation scheme in a broadband wireless communication system. Although an Orthogonal Frequency Division Multiple Access (OFDMA)-based wireless communication system will be described as an example, the present invention may also apply to other types of wireless communication systems.

A frame structure of FIG. 2 is used for a fixed allocation scheme of the present invention. Referring to FIG. 2, a downlink frame 210 includes a preamble region 211 for frame synchronization, a MAP region 213 for delivering resource allocation information, and a fixed allocation region 215 for allocating resources using the fixed allocation scheme. An uplink frame 220 includes a control region 221 and a fixed allocation region 223.

The fixed allocation region 215 in the downlink frame 210 is defined as a two-dimensional region, and resources in the fixed allocation region 215 are one-dimensionally allocated. Further, the fixed allocation region 223 in the uplink frame 220 is defined as a one-dimensional region, and resources in the fixed allocation region 223 are one-dimensionally allocated.

When allocating the resources in the fixed allocation region 215 of the downlink frame 210, all parts of the fixed allocation region 215 may conform to the fixed allocation scheme. Alternatively, some parts of the fixed allocation region 215 may conform to the fixed allocation scheme, and the remaining parts may conform to a general allocation scheme. When the general allocation scheme is used, resource allocation information is reported using a MAP message in every frame. For example, if the fixed allocation region 215 conforms only to the fixed allocation scheme, resources are one-dimensionally allocated as shown in FIG. 3A or 3B. On the other hand, if the fixed allocation regions 215 and 233 conform to the fixed allocation scheme and the general allocation scheme, resource regions conforming to the respective schemes are not identified in an absolute manner. Instead, the resources conforming to the respective schemes are one-dimensionally allocated in either a forward direction or a backward direction as shown in FIG. 3C. That is, the resources are identified in a relative manner. In FIG. 3A to 3C, an arrow mark indicates a direction of resource allocation. Although a vertical direction is shown as examples in FIG. 3A to 3C, a horizontal direction may be used in another exemplary embodiment.

Similarly to the fixed allocation region 215 of the downlink frame 210, resources in the fixed allocation region 223 of the uplink frame 220 may be allocated according to the fixed allocation scheme alone. Alternatively, some of the resources may be allocated using the fixed allocation scheme, and the remaining resources may be allocated using the general allocation scheme.

A base station (BS) of the present invention reports resource allocation, resource release (or deallocation), and resource change information of the fixed allocation region in the downlink frame and the uplink frame using a specific Information Element (IE) included in the MAP message. In the following descriptions, the IE including information on the fixed allocation region will be referred to as a 'fixed allocation IE'. One fixed allocation region has a periodicity. That is, in one fixed allocation region, an integer multiple of frames are spaced apart from one another at an interval. A plurality of fixed allocation regions having different periods may be used. Accordingly, the fixed allocation IE corresponding to a specific fixed allocation region is periodically transmitted. For convenience of description, only one fixed allocation region having a period of '1' will be considered hereinafter in describing the present invention.

Resources in the fixed allocation region are one-dimensionally allocated and are applied with an implicit resource shifting scheme. Therefore, locations of the remaining resources may change due to resource release or change. A specific resource is affected by the release or change of another resource if a resource located prior to the specific resource is released or changed. For example, a $4^{th}$ resource is affected when only the $1^{st}$ to $3^{rd}$ resources are released or changed. That is, if the MS knows the rank information of resources to be released or changed, the MS can determine whether locations of resources allocated to the MS are changed. Therefore, in the fixed allocation IE according to the present embodiment, identification information of a resource to be released or changed is expressed as relative rank in the fixed allocation region. According to another embodiment, the identification information of a resource to be released or changed is expressed as an offset and a duration.

An MS evaluates release or change information applied to resources allocated to another MS and determines whether a location of a resource allocated to the MS has changed. However, in a frame in which resource release or change occurs, an MS which fails to receive the MAP message cannot recognize the changes in the location of the resource allocated to the MS. To solve this problem, the fixed allocation IE is used to transmit information by which changes in a resource allocation state can be recognized by an MS to which resources are allocated using the fixed allocation scheme after the MS fails to receive the MAP message. According to a specific embodiment of the present invention, the change report information for recognizing the changes in the resource allocation state has a format of a counter variable or a format of a 1-bit change indicator. The counter variable is incremented or decremented according to whether the resource is released or changed.

When using the change report information in the counter variable format, if resource release or change occurs within the fixed allocation region, the BS increments the counter variable by a specific number corresponding to the number occurrences of resource release or change. Accordingly, the MS determines whether the counter variable is incremented, and thus can recognize whether the resource release or change occurs. On the other hand, when using the change report information in the change indicator format, if resource release or change occurs within the fixed allocation region, the BS sets the change indicator to '1', wherein the change indicator is included in the fixed allocation IE transmitted at a next fixed allocation period. According to the change indicator, the MS can recognize whether resource release or change occurs in the fixed allocation region of a previous period.

The fixed allocation IE of the present invention includes history information regarding resource release or change. Therefore, even if the MS fails to receive the MAP message when resource release or change occurs, the MS can recover the allocation state information of the fixed allocation region by using the change report information and the history information when a next MAP message is successfully received. If the change report information in use has the counter variable format, the history information is resource release or change information of a previous frame. However, the history information is not identified with a format (or a field) that is different from that of resource release or change information of a current frame within the fixed allocation IE. Therefore, the MS determines how many pieces of history information exist according to an increment of the counter variable, and identifies the pieces of history information according to an arrangement order of a plurality of pieces of information regarding resource release or change. On the other hand, if the change report information in use has the change indicator format, since the change indicator cannot indicate number information, the history information can include a retransmission flag that indicates whether the release or change occurs at a previous period. Herein, the length of the history information that will be transmitted by the BS may vary according to specific embodiments of the present invention.

Table 1 to Table 4 below show examples of a message configuration used to support fixed allocation when using the change report information in the counter variable format. The message configuration described in Table 1 to Table 4 below uses a Hybrid Automatic Repeat reQuest (HARQ) scheme and supports a fixed allocation region which uses general allocation together with fixed allocation.

TABLE 1

| P_HARQ DL MAP IE{ | |
|---|---|
| GroupID | Group ID |
| NumPreAllocation | Num of allocation before current frame |
| Persist_Allocation_Start_Pointer | Start point of new persist allocation |
| Persist_Change_Counter | Persistent Change Counter |

TABLE 1-continued

| | |
|---|---|
| NumNormalSubburst | Num of non-persistent allocation IE |
| NumDeAlloc&MCSChange | Num of DeAloc&MCS_Change_IE |
| NumPersistAllocation | Num of Persistent allocation IE |
| For(n=0; n<NumNormalSubburst; n++){ | |
| Normal_Subburst_IE( ) | |
| } | |
| For(n=0; n<NumDeAlloc&MCSChange; n++){ | |
| DeAlloc&MCS_Change_IE( ) | |
| } | |
| For(n=0; n<NumPersistAllocation; n++){ | |
| Persist_Allocation_Subburst_IE( ) | |
| } | |

TABLE 2

| | |
|---|---|
| P-HARQ UL MAP IE{ | |
| GroupID | Group ID |
| NumPreAllocation | Num of allocation before current frame |
| Persist_Allocation_Start_Pointer | Start point of new persist allocation |
| Persist_Change_Counter | Persistent Change Counter |
| NumNormalSubburst | Num of non-persistent allocation IE |
| NumDeAlloc&MCSChange | Num of DeAloc&MCS_Change_IE |
| NumPersistAllocation | Num of Persistent allocation IE |
| For(n=0; n<NumNormalSubburst; n++){ | |
| Normal_Subburst_IE( ) | |
| } | |
| For(n=0; n<NumDeAlloc&MCSChange; n++){ | |
| DeAlloc&MCS_Change_IE( ) | |
| } | |
| For(n=0; n<NumPersistAllocation; n++){ | |
| Persist_Allocation_Subburst_IE( ) | |
| } | |

Table 1 above shows a structure of a Persistent-HARQ DownLink MAP IE (P-HARQ DL MAP IE) indicating information of a fixed allocation region within a downlink frame. Table 2 above shows a structure of a Persistent-HARQ UpLink MAP IE (P-HARQ UL MAP IE) indicating information of a fixed allocation region within an uplink frame.

In Table 1 and Table 2 above, the 'Group ID' field is identification information of a fixed allocation region and is used to evaluate location and size information of the fixed allocation region and transmission period information. It is assumed in the present invention that the location and size information of the fixed allocation region and the transmission period information are broadcast through an additional message.

The 'NumPreAllocation' field indicates the number of MSs to which resources are allocated according to the fixed allocation scheme before a current frame. Each MS can recognize its order (i.e., rank) by using the 'NumPreAllocation' field.

The 'Persist_Allocation_Start_Pointer' field indicates a start location of fixed allocation in a current frame.

The 'Persist_Change_Counter' field indicates the number of occurrences of fixed allocation release or fixed allocation change and has a counter variable format. The fixed allocation change represents changes in resource amounts due to variation of a Modulation and Coding Scheme (MCS) level. For example, if the fixed allocation release occurs one time in a current frame, a value of the 'Persist_Allocation_Start_Pointer' field increases by 1, and if the fixed allocation release occurs one time and the fixed allocation change also occurs one time, the value of the 'Persist_Allocation_Start_Pointer' field increases by 2.

The 'NumNormalSubburst' field indicates the number of subbursts allocated according to the general allocation scheme in the current frame.

The 'NumDeAlloc&MCSChange' field indicates the number of occurrences of fixed allocation release or fixed allocation change. The 'NumPersistAllocation' field indicates the number of occurrences of fixed allocation in the current frame.

The 'Normal_Subburst_IE' indicates allocation information of resources allocated according to the general allocation scheme in the current frame.

The 'DeAllocation&MCS_Change_IE' indicates fixed allocation release or fixed allocation change information. More specifically, the 'DeAllocation&MCS_Change_IE' indicates fixed allocation release or fixed allocation change information corresponding to the 'Persist_Allocation_Start_Pointer' field value. For example, if a value of the 'Persist_Allocation_Start_Pointer' field is increased at an $n^{th}$ frame and is maintained up to an $(n+k)^{th}$ frame, 'DeAllocation&MCS_Change_IE' for indicating information on the fixed allocation release or the fixed allocation change that occurs at the $n^{th}$ frame is continuously included up to the $(n+k)^{th}$ frame. Herein, the number of times of maintaining the 'DeAllocation&MCS_Change_IE' may be regulated according to an exemplary embodiment of the present invention. For example, the 'DeAllocation&MCS_Change_IE' may be continued only up to a next frame of the current frame at which the fixed allocation release or the fixed allocation change occurs (that is, it can be repeated only one time). A detailed configuration of the 'DeAllocation&MCS_ChangeIE' will be described below with reference to Table 4.

The 'Persist_Allocation_Subburst_IE' indicates allocation information of resources allocated according to the fixed allocation scheme in the current frame. A detailed structure of the 'Persist_Allocation_Subburst_IE' will be described with reference to Table 3 below.

TABLE 3

| Persist_Allocation_Subburst_IE{ | |
|---|---|
| CID | Connection ID of each MS |
| Duration | Allocation size |
| DIUC(or UIUC) | DIUC or UIUC used |
| Repetition | Repetition coding |
| ACKCH index | ACK Channel index |

In Table 3 above, the 'Connection IDentifier (CID)' field indicates an identifier of an MS allocated with resources according to the 'Persist_Allocation_Subburst_IE'.

The 'Duration' field indicates a size of an allocated resource, and is represented by the number of slots.

The 'DIUC (or UIUC)' field indicates Downlink Interval Usage Code (DIUC) coding information or Uplink Interval Usage Code (UIUC) coding information. If the 'Persist_Allocation_Subburst_IE' is allocation information in the fixed allocation region in downlink, the DIUC coding information is included. If the 'Persist_Allocation_Subburst_IE' is allocation information in the fixed allocation region in uplink, the UIUC coding information is included.

The 'Repetition' field indicates applied iterative coding information.

The 'ACKCH index' indicates an index of a HARQ ACKnowledge (ACK)/Non-ACK(NACK) feedback channel.

TABLE 4

| DeAlloc&MCS_Change_IE{ | |
|---|---|
| Type | Type = 0: Deallocation |
| | Type = 1: MCS Change |
| If(Type==0){ | |
| Rank | Rank of the deallocated burst |
| Duration | Duration of the deallocated burst |
| } | |
| If(Type==1){ | |
| Rank | Rank of the MCS changed burst |
| DIUC(or UIUC) | New DIUC(or UIUC) |
| Delta_Duration | Difference of the allocation size |
| } | |

In Table 4 above, the 'Type' field indicates whether 'DeAlloc&MCS_Change_IE' includes allocation release information or allocation change information.

The 'Rank' field indicates a relative rank of to-be-released or changed resources.

The 'Duration' field indicates a size of a to-be-released resource, and is represented by the number of slots.

The 'DIUC (or UIUC)' field indicates DIUC coding or UIUC coding information newly applied according to a variation of the MCS level. If the 'DeAlloc&MCS_Change_IE' is allocation information in the fixed allocation region in downlink, the DIUC coding information is included. If the 'DeAlloc&MCS_Change_IE' is allocation information in the fixed allocation region in uplink, the UIUC coding information is included.

The 'Delta_Duration' field indicates a size of a resource to be subjected to allocation change according to variation of the MCS level. The 'Delta_Duration' field is represented with the number of slots, and has a positive integer value or a negative integer value.

If the change report information in use has the change indicator format, a message used for the fixed allocation scheme has a structure, for example, as shown in Table 1 to Table 4 described above.

The fixed allocation IE will be described by comparing Table 1 and Table 2. The fixed allocation IE includes a change indicator field instead of the 'Persist_Change_Counter' field. In addition, the fixed allocation IE may further include boosting information of the fixed allocation region, information indicating a HARQ scheme (e.g., chase combining, incremental redundancy, and so forth), and duration information of a subburst IE for each MS depending on the HARQ scheme.

In comparison with Table 3 above, a subburst IE for indicating a resource allocation for each MS further includes a flag for distinguishing the fixed allocation and the general allocation, a start offset and duration of an allocated resource, HARQ NACK channel-related information, and so forth. In comparison with Table 4 above, a subburst IE for indicating a resource release further includes a start offset and duration of a released resource, a retransmission flag for indicating whether the release or change occurs at a previous period, and so forth. The subburst for indicating the resource allocation and the subburst for indicating the resource release may be defined with one IE. In this case, the subburst further includes a flag for indicating whether it is for allocation or release.

When resources are allocated, released, and changed according to the fixed allocation scheme of the present invention, the aforementioned IEs can be utilized, which will be described below with reference of FIGS. 4A to 4D. In FIGS. 4A to 4D, each block represents a slot that is a minimum unit of resource allocation. A numeric character written in each block indicates a slot index. An alphabetical character indicates an index of an MS allocated with a corresponding slot. It will be assumed in the description of FIGS. 4A to 4D that a transmission period of a fixed allocation region is one frame.

In a first case, change report information in the aforementioned counter variable format is used (that is, the messages shown in Table 1 to Table 4 above are used).

It is assumed that, in an $n^{th}$ frame, an allocation pattern of the fixed allocation region is as shown in FIG. 4A. Referring to FIG. 4A, slots 0 to 6 are allocated to an MS A, and slots 7 to 8 are allocated to an MS B. A rank of the MS A is 1, and a rank of the MS B is 2.

In an $(n+1)^{th}$ frame, a BS fixedly allocates four slots to an MS C, and also fixedly allocates two slots to an MS D. Accordingly, in the P-HARQ DL MAP IE as shown in Table 1 above, the BS sets a value of the 'Persist_Allocation_Start_Pointer' field to 9, a value of the 'NumPersistAllocation' to 2, and a value of the 'NumPreAllocation' field to 2. Further, the BS generates two Persist_Allocation_Subburst_IE fields as shown in Table 3 above. Herein, the 'CID' field of Persist_Allocation_Subburst_IE corresponding to the MS C is set to a CID of the MS C, and the 'Duration' field is set to 4. Likewise, the 'CID' field of Persist_Allocation_Subburst_IE corresponding to the MS D is set to a CID of the MS D, and the 'Duration' field is set to 2. In the P-HARQ DL MAP IE, the Persist_Allocation_Subburst_IE corresponding to the MS C is located prior to the Persist_Allocation_Subburst_IE corresponding to the MS D. The rank of Persist_Allocation_Subburst_IE denotes a resource allocation rank.

In this manner, the MS C and the MS D receive the P-HARQ DL MAP IE, and evaluate a value of the 'Persist_Allocation_Start_Pointer' field, a value of the 'NumPersistAllocation' field, and two Persist_Allocation_Subburst_IEs. Thereafter, the MS C and the MS D calculate locations of slots fixedly allocated to the MS C and the MS D. That is, according to a value of the 'Persist_Allocation_Start_Pointer' field and a value of the 'Duration' field, the MS C determines that four slots starting with a slot 9 are slots allocated to the MS C. The MS D calculates a last slot allocated to the MS C, and determines two slots next to the last slot allocated to the MS C as slots allocated to the MS D according to the value of the 'Duration' field. The MS C and the MS D calculate their ranks according to the value of the 'NumPreAllocation' field. As a result, the allocation pattern of the fixed allocation region is changed as shown in FIG. 4B.

In an $(n+2)^{th}$ frame, the BS releases a resource fixedly allocated to the MS B. Accordingly, in the P-HARQ DL MAP IE as shown in Table 1 above, the BS sets a value of the 'NumDeAlloc&MCSChange' field to 1, increases the value of the 'Persist_Change_Counter' field by 1, and generates one DeAlloc&MCS_Change_IE as shown in Table 4 above. In this case, a 'Type' field of the DeAlloc&MCS_Change_IE is set to 0, a 'Rank' field is set to the rank (i.e., 2) of the MS B, and a 'Duration' field is set to 2.

In this manner, the MS A, the MS B, the MS C, and the MS D receive the P-HARQ DL MAP IE and recognize that a value of the 'Persist_Change_Counter' field has increased, and also recognize that a value of the 'NumDeAlloc&MCSChange' field is 1. Further, the MSs A, B, C, and D evaluate the 'Rank' field of the DeAlloc&MCS_Change_IE. The value of the 'Rank' field is 2, and the rank of the MS A is 1. Since the value of the 'Rank' field is greater than the rank of the MS A, the MS A ignores the DeAlloc&MCS_Change_IE. Since the 'Rank' field value of 2 is equal to the rank of the MS B, the MS B recognizes that slots allocated to the MS B have been released. In addition, since the 'Rank' field value of 2 is less than the ranks of the MS C and the MS D, the MS C and the MS D recognize that locations of the slots allocated to the MS C and the MS D have been moved forward by two slots according to the 'Duration' field value. As a result, the allocation pattern of the fixed allocation region is changed as shown in FIG. 4C.

In an $(n+3)^{th}$ frame, the BS decreases resources fixedly allocated to the MS A by two slots according to changes in an MCS level applied to the MS A. Accordingly, in the P-HARQ DL MAP IE as shown in Table 1 above, the BS sets the 'NumDeAlloc&MCSChange' field value to 1, increases the 'Persist_Change_Counter' field value by 1, and generates one DeAlloc&MCS_Change_IE as shown in Table 4 above. In the DeAlloc&MCS_Change_IE corresponding to the MS A, the 'Type' filed is set to 1, the 'Rank' field is set to the rank (i.e., 1) of the MS A, and the 'Delta_Duration' field is set to '−2'.

Accordingly, upon receiving the P-HARQ DL MAP IE, the MS A, the MS C, and the MS D recognize that the 'Persist_Change_Counter' field value is increased, and also recognize that the 'NumDeAlloc&MCSChange' field value is 1. Further, the MS A, the MS C, and the MS D evaluate the 'Rank' field. Since the 'Rank' field value of 1 is equal to the rank of the MS A, the MS A recognizes that slots allocated to the MS A have been decreased by two slots. In addition, since the 'Rank' field value of 1 is less than the ranks of the MS C and the MS D, the MS C and the MS D recognize that locations of slots allocated to the MS C and the MS D have moved forward by two slots according to the 'Delta_Duration' field value. As a result, the allocation pattern of the fixed allocation region is changed as shown in FIG. 4D.

In an $(n+4)^{th}$ frame, the BS does not perform allocation release or allocation change on the fixed allocation region. However, according to the present invention, the BS transmits the DeAlloc&MCS_Change_IE including allocation change information generated at the $(n+3)^{th}$ frame. Accordingly, in a case where an MS unsuccessfully receives a MAP message at the $(n+3)^{th}$ frame and thus fails to obtain the allocation change information generated at the $(n+3)^{th}$ frame, the MS can recover a fixed allocation IE without the aid of other elements. If it is assumed that the MS C fails to receive the MAP message at the $(n+3)^{th}$ frame, the MS C recovers resource allocation information at the $(n+4)^{th}$ frame as follows.

In the even that the MS C cannot perform communication due to failure in receiving the MAP message at the $(n+3)^{th}$ frame, upon successfully receiving the MAP message at the $(n+4)^{th}$ frame, the MS C analyzes the P-HARQ DL MAP IE. In this case, the MS C determines that the 'NumDeAlloc&MCSChange' field value is 0, and the 'Persist_Change_Counter' field value is increased. Therefore, the MS C recognizes that an allocation release or allocation change occurred when the MS C failed to receive the MAP message. Therefore, the MS C evaluates the 'Rank' field of the DeAlloc&MCS_Change_IE. The result of evaluating of the 'Rank' field shows that the 'Rank' field value of 1 is less than the rank of the MS C. Thus, the MS C recognizes that slots allocated to the MS C have moved forward by two slots according to the 'Delta_Duration' field value.

Next, a case of using change report information in the aforementioned change indicator format will be described.

It is assumed that, in an $n^{th}$ frame, an allocation pattern of a fixed allocation region is as shown in FIG. 4A. Referring to FIG. 4A, slots 0 to 6 are allocated to an MS A, and slots 7 to 8 are allocated to an MS B.

In an $(n+1)^{th}$ frame, as shown in FIG. 4B, a BS fixedly allocates four slots to an MS C, and also fixedly allocates two slots to an MS D. The BS transmits a fixed allocation IE including two pieces of subburst information for reporting allocation. In this case, in subburst information corresponding to the MS C, a start offset is set to 9, and a duration is set to 4. In addition, in subburst information corresponding to the MS D, a start offset is set to 13, and a duration is set to 2. Upon receiving the fixed allocation IE at the $(n+1)^{th}$ frame, the MS C and the MS D evaluate locations of slots allocated to the MS C and the MS D by using subburst information including CIDs of the MS C and the MS D.

In an $(n+2)^{th}$ frame, as shown in FIG. 4C, the BS releases a resource fixedly allocated to the MS B. The BS transmits a fixed allocation IE including one piece of subburst information for reporting release. That is, in the subburst information for reporting the release, a CID is set to the CID of the MS B, a start offset is set to 7, a duration is set to 2, and a retransmission flag is set to 0. Upon receiving the fixed allocation IE at the $(n+2)^{th}$ frame, the MS B recognizes that a resource allocated to the MS B is released through subburst information including the CID of the MS B. Upon receiving the fixed allocation IE at the $(n+2)^{th}$ frame, the MS C and the MS D recognize that resources allocated to the MS C and the MS D move due to release of the resource allocated to the MS B.

Thereafter, in an $(n+3)^{th}$ frame, the BS transmits the fixed allocation IE which includes the subburst information indicating release of the resource allocated to the MS B and which was generated at the $(n+2)^{th}$ frame. In the fixed allocation IE, a change indicator is set to 1. In the subburst information indicating release of the resource allocated to the MS B, a retransmission flag is set to 1.

It is assumed that the MS C fails to receive the MAP message at the $(n+2)^{th}$ frame. In this case, the MS C cannot perform communication at the $(n+2)^{th}$ frame. In addition, the MS C cannot recognize release of the resource allocated to the MS B. However, since it is determined that the change indicator is 1 at the $(n+3)^{th}$ frame, the MS C recognizes that a resource state was changed at the $(n+2)^{th}$ frame. By evaluating subburst information for reporting release and having a retransmission flag of 1, the MS C recognizes that a resource release occurred at the $(n+2)^{th}$ frame. Accordingly, the MS C can recognize a correct allocation pattern at the $(n+3)^{th}$ frame.

In the above explanation described with reference to FIG. 4, the BS transmits the history information without receiving an additional request. However, according to another exemplary embodiment of the present invention, the BS transmits information indicating resource release or change, which has previously occurred, as the history information only when the request is received. That is, the MS recognizes that the allocation pattern changed at a frame in which the receiving of the MAP message failed, and thus the MS reports to the BS that there is a change in unrecognized resources. Then, the BS transmits the history information according to the report of the MS. If change report information in use has a counter variable format, the MS reports an increment of the counter variable, and the BS transmits a predetermined number of pieces of history information, wherein the predetermined number corresponds to the increment reported from the MS. For example, the MS may transmit an additional message or may transmit a specific code through a Channel Quality Information (CQI) channel.

According to still another exemplary embodiment of the present invention, the BS continuously transmits the history information a predetermined number of times without receiving a report from the MS, and thereafter retransmits the history information upon receiving the report.

Hereinafter, structures and operations of a BS and an MS will be described in detail with reference to the accompanying drawings.

FIG. 5 is a block diagram of a BS in a broadband wireless communication system according to an exemplary embodiment of the present invention.

Referring to FIG. 5, the BS includes a controller 502, a scheduler 504, a message generator 506, a data buffer 508, a coder 510, a symbol modulator 512, a subcarrier mapper 514, an Orthogonal Frequency Division Multiplexing (OFDM) modulator 516, and a radio frequency (RF) transmitter 518.

The controller 502 provides overall control of the BS. That is, the controller 502 provides necessary information required to operate other functional blocks included in the BS and controls an operation time point of each block. For example, the controller 502 provides the scheduler 504 with to-be-scheduled service flow list information and traffic property information for each service flow. Further, the controller 502 provides the subcarrier mapper 514 with the scheduling result of the scheduler 504.

According to a first exemplary embodiment of the present invention, the controller 502 manages a counter variable which is incremented when resources within a fixed allocation region are released or changed. That is, the controller 502 increments the counter variable according to the number of times the resources are released or changed, and provides the counter variable to the message generator 506. Further, the controller 502 provides control to transmit history information regarding release or change of the resources within the fixed allocation region. According to the exemplary embodiment of the present invention for transmitting the history information, the controller 502 provides control to continuously transmit the history information a predetermined number of times after the resources within the fixed allocation region are released or changed. According to another exemplary embodiment of the present invention for transmitting the history information, the controller 502 provides control to transmit the history information when transmission of the history information is requested by an MS.

According to a second exemplary embodiment of the present invention, the controller 502 manages a change indicator which is set to 1 when the resources within the fixed allocation region are released. When the change indicator is set to 1, it means that the resource is released not at a current frame but at one frame before. In other words, the controller 502 sets the change indicator to 1, wherein the change indicator is to be transmitted at one frame later with respect to a frame at which the resource is released. In addition, at a frame at which the change indicator of 1 is transmitted, the controller 502 provides control so that history information for the release of the resource within the fixed allocation region is transmitted. According to the exemplary embodiment of the present invention for transmitting the history information, the controller 502 provides control so that the history information is transmitted a predetermined number of times, wherein the predetermined number is determined after releasing the resource within the fixed allocation region. According to another exemplary embodiment of the present invention for transmitting the history information, the controller 502 provides control so that the history information is transmitted at a history information transmission request of the MS.

The scheduler 504 allocates radio resources to transmit and receive data of an activated service flow. In particular, according to the present invention, the scheduler 504 assigns some portions of a downlink frame and an uplink frame to the fixed allocation region, and allocates the resources within the fixed allocation region to the MS. In this case, the scheduler 504 two-dimensionally allocates the fixed allocation region of the downlink frame and one-dimensionally allocates the fixed allocation region of the uplink frame. In addition, the scheduler 504 one-dimensionally allocates the resources within each fixed allocation region. When the resources within each fixed allocation region are one-dimensionally allocated, the scheduler 504 applies an implicit resource shifting scheme when the resources are released.

According to a communication protocol, the message generator 506 generates a Media Access Control (MAC) management message to be transmitted to the MS. For example, the message generator 506 generates a MAP message for reporting the resource allocation result of the scheduler 504. In particular, the message generator 506 generates a fixed allocation IE for indicating information regarding allocation of resources within the fixed allocation region.

According to the first exemplary embodiment of the present invention, the fixed allocation IE includes a counter variable which is incremented when the resources within the fixed allocation region are released or changed. The fixed allocation IE also includes history information regarding release or change of the resources. Herein, the history information is included a predetermined number of times continuously and repetitively upon changing or releasing the resource, or is included at the request of the MS. In the fixed allocation IE, identification information of the resource to be released or changed is represented with relative rank information in the fixed allocation region. For example, the fixed allocation IE and a plurality of IEs included in the fixed allocation IE are configured as shown in Table 1 to Table 4 above. In this case, in consideration of overhead, the message generator 506 can generate the fixed allocation IE by excluding some unnecessary fields in the configuration of Table 1 above.

According to the second exemplary embodiment of the present invention, the message generator 506 generates a fixed allocation IE for including a change indicator. The change indicator is set to 1 by releasing a resource generated at one frame before. When the change indicator is set to 1, the message generator 506 generates a fixed allocation IE including history information regarding resource release. The history information regarding resource release has the same format as the subburst information that reports release of a resource generated at a current frame. A retransmission flag is used to identify the subburst information as the history information from the subburst information for reporting resource release at the current frame. Thus, when the subburst information is generated as the history information, the message generator 506 generates subburst information including the retransmission flag, which is set to 1. When resource allocation occurs, the message generator 506 generates subburst information for reporting resource allocation, wherein the subburst information includes at lease one of a CID of an MS to be allocated with the resource, a flag for distinguishing fixed allocation and general allocation, and a start offset and duration of the resource to be allocated. When resource release occurs, the message generator 506 generates subburst information for reporting resource release, wherein the subburst information includes at least one of a CID of an MS to which the resource to be released has been allocated, a start offset and duration of the resource to be released, a retransmission flag, and a flag for distinguishing fixed allocation and general allocation.

The data buffer 508 temporarily stores data to be transmitted to the MS and outputs the stored data according to the resource allocation result of the scheduler 504. The coder 510 performs channel coding on an information bit-stream provided from the message generator 506 and the data buffer 508. The symbol modulator 512 demodulates the channel-coded bit-stream and converts the bit-stream into complex symbols. The subcarrier mapper 514 maps the complex symbols to a frequency domain according to the resource allocation result of the scheduler 504. The OFDM modulator 516 transforms the complex symbols mapped to the frequency domain into a time-domain signal by performing an Inverse Fast Fourier Transform (IFFT) operation, and configures an OFDM symbol by inserting a Cyclic Prefix (CP). The RF transmitter 518 up-converts a baseband signal into an RF signal and then transmits the RF signal through an antenna.

Figure 6:
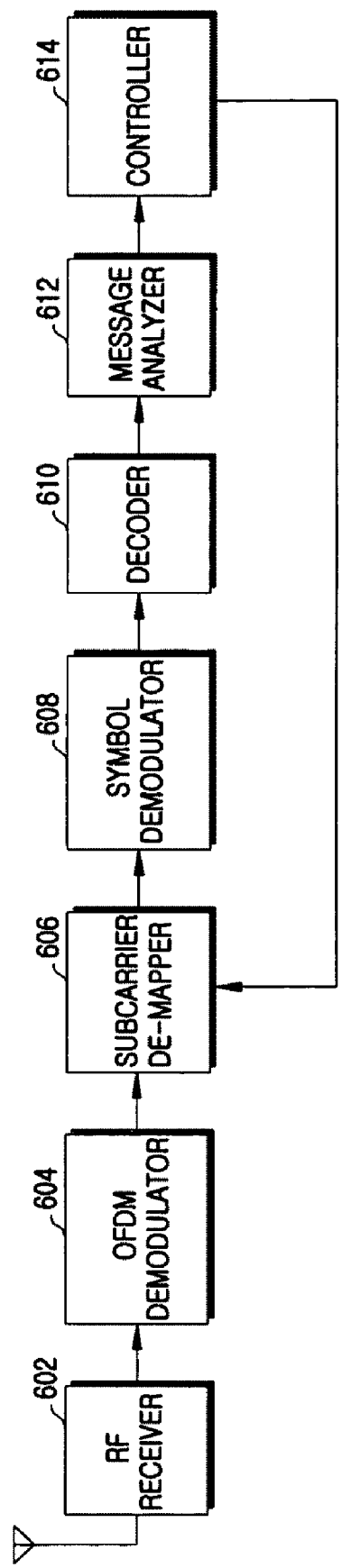
FIG. 6 is a block diagram of a mobile station (MS) in a broadband wireless communication system according to an exemplary embodiment of the present invention.

FIG. 6 is a block diagram of an MS in a broadband wireless communication system according to an exemplary embodiment of the present invention.

Referring to FIG. 6, the MS includes an RF receiver 602, an OFDM demodulator 604, a subcarrier de-mapper 606, a symbol demodulator 608, a decoder 610, a message analyzer 612, and a controller 614.

The RF receiver 602 receives an RF signal through an antenna and down-converts the RF signal into a baseband signal. The OFDM demodulator 604 identifies signals provided from the RF receiver 602 according to a unit of OFDM symbol, removes a CP, and restores complex symbols mapped onto a frequency domain by performing a Fast Fourier Transform (FFT) operation. Among the complex symbols mapped onto the frequency domain, the subcarrier de-mapper 606 extracts a signal mapped to a resource allocated to the MS. The symbol demodulator 608 demodulates the complex symbols and thus converts the symbols into a bit-stream. The decoder 610 performs channel decoding on the bit-stream and thus restores an information bit-stream.

According to a communication protocol, the message analyzer 612 analyzes MAC management messages received from a BS. For example, the message analyzer 612 analyzes a MAP message for reporting resource allocation information. In particular, according to the present invention, the message analyzer 612 analyzes a fixed allocation IE for indicating resource allocation information of the fixed allocation region included in the MAP message.

According to a first exemplary embodiment of the present invention, the fixed allocation IE includes a counter variable which is incremented along with the occurrence of resource release or change within the fixed allocation region and also includes history information regarding resource release or change. Thus, the message analyzer 612 evaluates the counter variable included in the fixed allocation IE. In the fixed allocation IE, identification information of the resource to be released or changed is represented with relative rank information in the fixed allocation region. For example, the fixed allocation IE and a plurality of IEs included in the fixed allocation IE are configured as shown in Table 1 to Table 4 above.

According to a second exemplary embodiment of the present invention, the fixed allocation IE includes a change indicator. The change indicator is set to 1 by releasing a resource generated at a frame corresponding to a previous fixed allocation period. Thus, the message analyzer 612 evaluates the change indicator included in the fixed allocation IE. The fixed allocation IE including the change indicator of 1 includes history information regarding resource release. The history information regarding resource release has the same format as subburst information that reports release of a resource generated at a current frame. A retransmission flag is used to identify the subburst information as the history information from the subburst information for reporting resource release at the current frame. Thus, by analyzing subburst information for reporting resource release, the message analyzer 612 evaluates at least one of the retransmission flag, a CID of an MS to which the resource to be released has been allocated, a start offset and duration of the resource to be released, and a flag for distinguishing fixed allocation and general allocation. In addition, by analyzing subburst information for reporting resource allocation, the message analyzer 612 evaluates at least one of a CID of an MS to be allocated with the resource, a flag for distinguishing fixed allocation and general allocation, and a start offset and duration of the resource to be allocated.

The controller 614 provides overall control to the MS. That is, the controller 614 provides necessary information required to operate other functional blocks included in the MS, and thus controls each block. For example, the controller 614 recognizes a physical location of an allocated resource by using the resource allocation information provided from the message analyzer 612, and provides the physical location information to the subcarrier de-mapper 606. In particular, according to the present invention, the controller 614 recognizes an allocation state of the fixed allocation region by using information included in the fixed allocation IE.

According to the first exemplary embodiment of the present invention, when resources are fixedly allocated in a fixed allocation region, the controller 614 calculates a rank of the MS by considering the number of previously fixed allocation resources included in the fixed allocation IE. When the resources are released or changed in the fixed allocation region, the controller 614 compares rank information of the MS with rank information of resources to be released or changed. The rank information of resource to be released or changed is included in the resource release or change information. Through the comparison, the controller 614 determines whether a location of the resource allocated to the MS has changed. For example, the controller 614 evaluates a rank of the resource to be released or changed, and if the rank of the resource is less than the rank of the MS, the controller 614 shifts the location of the resource allocated to the MS. If a MAP message is unsuccessfully received at a specific frame and thus information included in the fixed allocation IE cannot be obtained, according to a counter variable included in a next fixed allocation IE, the controller 614 determines whether a resource was released or changed at a time point when the receiving of the MAP message failed. That is, the controller 614 determines a presence/absence of history information. If the history information is present, the controller 614 restores allocation state information of the fixed allocation region by using the history information regarding resource release or change. For example, the fixed allocation IE and a plurality of IEs included in the fixed allocation IE are configured as shown in Table 1 to Table 4 above.

According to the second exemplary embodiment of the present invention, when a resource is fixedly allocated in a fixed allocation region, the controller 614 evaluates the resource allocated to the MS according to subburst information including the MS CID included in the fixed allocation IE. When resource release occurs in the fixed allocation region, the controller 614 compares a start point of the resource to be released with a start point of the resource allocated to the MS, wherein the start point of the resource to be released is included in the subburst information. Through comparison, the controller 614 determines whether a location of the resource allocated to the MS has changed. If the determination result shows that a resource located prior to the resource allocated to the MS is released, the controller 614 shifts the location of the resource allocated to the MS. If a MAP message is unsuccessfully received at a specific frame and thus information included in the fixed allocation IE cannot be obtained, according to a change indicator included in a next fixed allocation IE, the controller 614 determines whether the resource was released at a time point when the receiving of the MAP message failed. That is, the controller 614 determines a presence/absence of history information. If the history information is present, the controller 614 restores allocation state information of the fixed allocation region by using the history information. In this case, the controller 614 determines whether the subburst information is history information by considering the retransmission flag included in the subburst information. That is, the controller 614 restores the allocation state information by using the subburst information including the retransmission flag of 1.

In a case where the BS transmits the history information at the request of the MS, the controller 614 requests resource release or change information (i.e., history information) which was unsuccessfully received. For example, when change report information in use has a counter variable format, the controller 614 provides control so that an increment of the counter variable is reported to the BS. In this case, the history information is requested using an additional message or using a specific code through a CQI channel.

Figure 7:
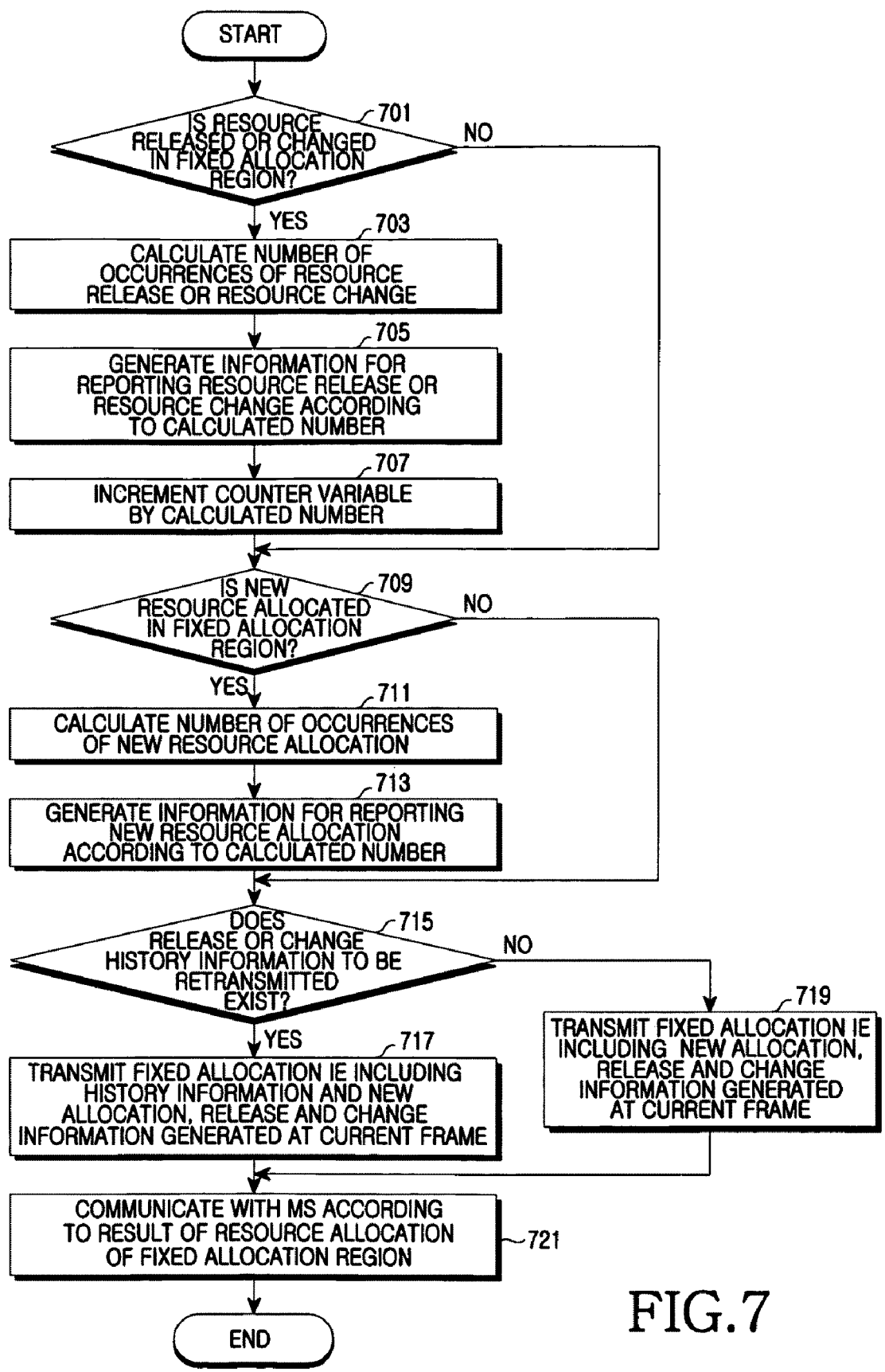
FIG. 7 is flowchart illustrating an operation of a BS in a broadband wireless communication system according to a first exemplary embodiment of the present invention.

FIG. 7 is flowchart illustrating an operation of a BS in a broadband wireless communication system according to a first exemplary embodiment of the present invention. In FIG. 7, the BS performs communication using a fixed allocation region in one frame.

Referring to FIG. 7, the BS determines whether resources are released or changed in a fixed allocation region of a current frame in step 701. If the resources are not released or changed in the fixed allocation region of the current frame, the procedure proceeds to step 709.

Otherwise, if resource release or change occurs in the fixed allocation region of a current frame, proceeding to step 703, the BS calculates the number of occurrences of resource release or change. That is, the BS determines how many times resources are released or changed.

In step 705, the BS generates information for reporting the resource release or change according to the above calculated number. In this case, identification information of resources to be released or changed is represented with relative rank information in the fixed allocation region. For example, the information for reporting resource release or change is configured as shown in Table 4 above.

After generating the information for reporting resource release or change, proceeding to step 707, the BS increments a counter variable by the calculated number.

In step 709, the BS determines whether a new resource is allocated in the fixed allocation region of the current frame. If there is no new resource allocated in the fixed allocation region of the current frame, the procedure proceeds to step 715.

If the new resource is allocated in the fixed allocation region of the current frame, proceeding to step 711, the BS calculates the number of occurrences of new resource allocation. That is, the BS determines how many times new resource allocation occurs.

In step 713, the BS generates information for reporting new resource allocation according to the calculated number. For example, the information for reporting new resource allocation is configured as shown in Table 3 above.

In step 715, the BS determines whether history information for resource release or change has to be transmitted in the current frame. In this case, the determination on the retransmission of the history information is achieved differently according to specific exemplary embodiments of the present invention. For example, the history information may be continuously transmitted a predetermined number of times or may be transmitted at the request of an MS. In addition, the history information may be continuously retransmitted a predetermined number of times without the request and may be retransmitted at the request.

If there is history information to be retransmitted, proceeding to step 717, the BS transmits a fixed allocation IE including new resource allocation information, resource release or change information, and history information which are generated at the current frame. The fixed allocation IE further includes the information on the calculated number of occurrences of resource release or change at the current frame (see step 703), the information on the incremented counter variable (see step 707), the information on the calculated number of occurrences of new resource allocation at the current frame (see step 711), information on a start point at which new allocation begins, and information on the number of resources previously fixedly allocated. For example, the fixed allocation IE may be configured as shown in Table 1 and Table 2 above.

On the other hand, if there is no history information to be retransmitted, proceeding to step 719, the BS transmits the fixed allocation IE including the new resource allocation information and the resource release or change information which are generated at the current frame. The fixed allocation IE further includes the information on the calculated number of occurrences of resource release or change at the current frame (see step 703), the information on the incremented counter variable (see step 707), the information on the calculated number of occurrences of new resource allocation at the current frame (see step 711), information on a start point at which new allocation begins, and information on the number of resources previously fixedly allocated. For example, the fixed allocation IE may be configured as shown in Table 1 and Table 2 above.

After transmitting the fixed allocation IE, proceeding to step 721, the BS communicates with the MS according to a result of resource allocation of the fixed allocation region. In this case, the BS adjusts locations of resources allocated to the MS by using an implicit resource shifting scheme when resource release or change occurs.

Figure 8:
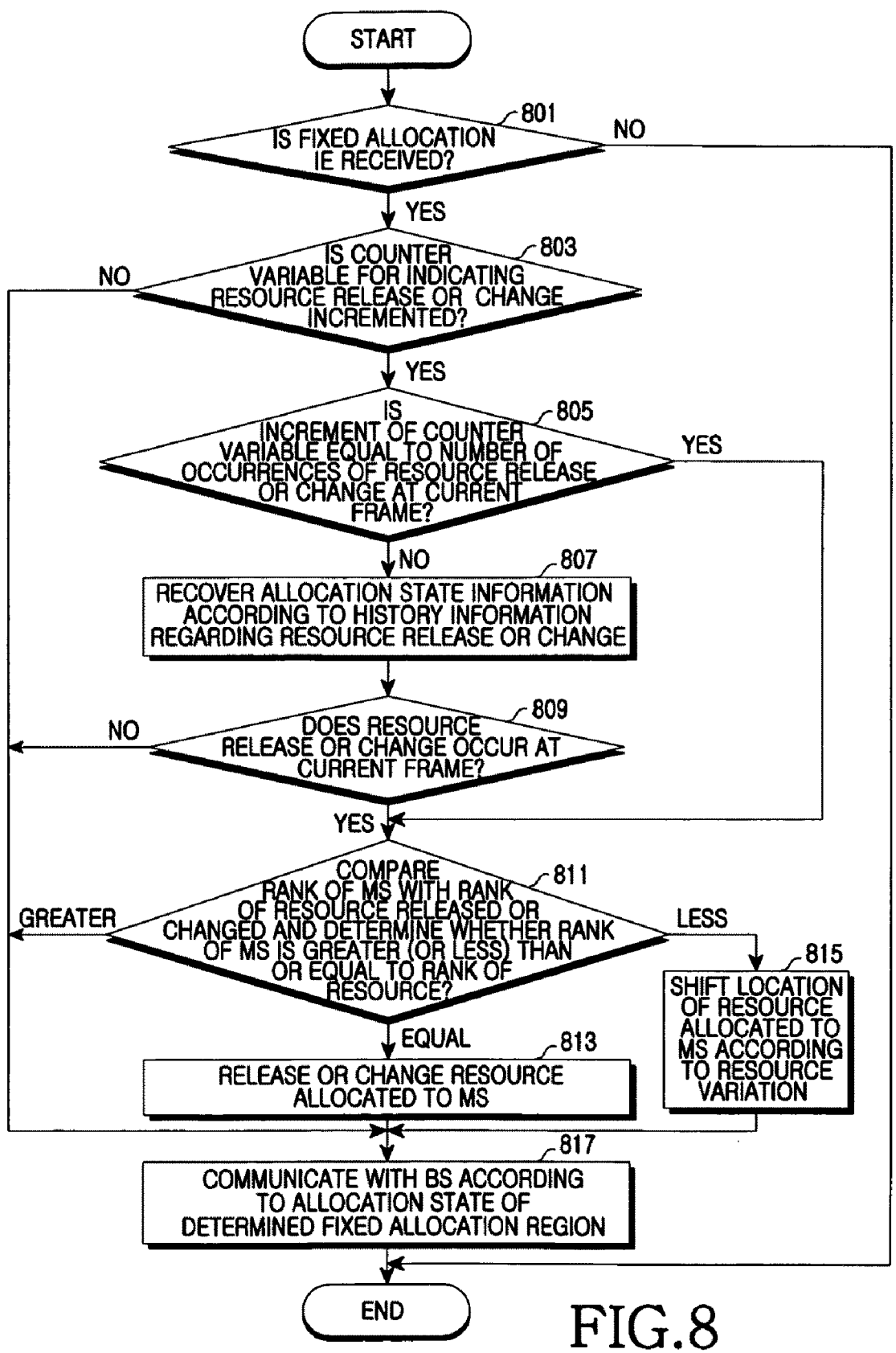
FIG. 8 is flowchart illustrating an operation of an MS in a broadband wireless communication system according to a first exemplary embodiment of the present invention.

FIG. 8 is flowchart illustrating an operation of an MS in a broadband wireless communication system according to a first exemplary embodiment of the present invention. In FIG. 8, the MS performs communication using a fixed allocation region in one frame.

Referring to FIG. 8, the MS determines whether a fixed allocation IE is received in step 801. That is, the MS determines whether an error is detected as a result of a Cyclic Redundancy Check (CRC) of a signal extracted from a MAP message region of the frame. If a fixed allocation IE is unsuccessfully received, the procedure of FIG. 8 ends. Herein, the fixed allocation IE includes information on the number of occurrences of resource release or change at the current frame, counter variable information, information on the number of occurrences of new resource allocation at the current frame, information on a start point at which new allocation begins, and information on the number of resources previous fixedly allocated. According to changes in an allocation state, the fixed allocation IE can include resource allocation information, resource release or change information, history information, and so forth. For example, the fixed allocation IE may be configured as shown in Table 1 and Table 2 above.

On the other hand, upon receiving the fixed allocation IE, proceeding to step 803, the MS determines whether the counter variable for indicating resource release or change is incremented. If the counter variable is not incremented (that is, the counter variable included in the previously received fixed allocation IE is equal to the counter variable included in the fixed allocation IE received at the current frame), the procedure proceeds to step 817.

On the other hand, if the counter variable is incremented (that is, the counter variable included in the fixed allocation IE received at the current frame is greater than the counter variable included in the previously received fixed allocation IE), proceeding to step 805, the MS determines whether an increment of the counter variable is equal to the number of occurrences of resource release or change at the current frame. In other words, the MS determines whether only the resource release or change at the current frame is a cause of the increase in the counter variable. If the increment of the counter variable is equal to the number of occurrences of resource release or change at the current frame, the procedure proceeds to step 811.

If the increment of the counter variable is not equal to the number of times of occurrence of resource release or change at the current frame (that is, if the increment of the counter variable is greater than the number of times of occurrence of resource release or change at the current frame), proceeding to step 807, the MS recognizes that resources were released or changed at a time point when the receiving of the previous MAP message failed, and thus recovers allocation state information according to history information regarding resource release or change. In other words, the MS recovers current allocation state information by considering the history information according to the increment of the counter variable.

In step 809, the MS determines whether resource release or change occurs at the current frame. That is, the MS determines whether a value for indicating the number of occurrences of resource release or change of the current frame is 0, wherein the value is included in the fixed allocation IE. If the resource release or change does not occur, the procedure proceeds to step 817.

If the resource release or change occurs, proceeding to step 811, the MS compares a rank of a resource released or changed with a rank of the MS. In this case, the MS obtains first rank information by calculating the rank of the MS. The rank of the MS is calculated using information on the number of previous fixed allocated resources, wherein the information is included in the fixed allocation IE received when a first resource is fixedly allocated. Thereafter, when resource release or resource change occurs, the MS obtains rank information from the current frame by continuously managing the rank information of the MS. If the rank of the resource released or changed is greater than the rank of the MS, the MS ignores resource release or change information, and the procedure proceeds to step 817.

If the rank of the resource released or changed is equal to the rank of the MS, proceeding to step 813, the MS releases the resource allocated to the MS or changes a size of the resource. The size of the resource is changed only in the case of resource change according to resource variation amount information included in the resource release or change information. For example, the resource release or change information may be configured as shown in Table 4 above.

If the rank of the resource released or changed is less than the rank of the MS, proceeding to step 815, the MS shifts the location of the resource allocated to the MS according to the resource variation resulting from the resource release or change. The resource location is shifted according to the resource release amount information or resource variation amount information included in the resource release or change information. For example, the resource release or change information may be configured as shown in Table 4 above. If a plurality of pieces of resource release or change information exists, the MS repeats steps 811 to 815 according to the resource release or change information.

In step 817, the MS communicates with the BS according to an allocation state of the determined fixed allocation region. If the resource is released in step 813, the MS does not perform communication using the fixed allocation region.

In the exemplary embodiment described above with reference to FIG. 8, if it is determined that history information regarding unconsidered resource release or change exists by using the counter variable, the MS recovers the allocation state information of the fixed allocation region by using the history information in step 807. However, according to another exemplary embodiment of the present invention, if it is determined that history information regarding unconsidered resource release or change exists by using the counter variable, the MS requests the BS to transmit the history information, and the procedure proceeds to step 809.

Figure 9:
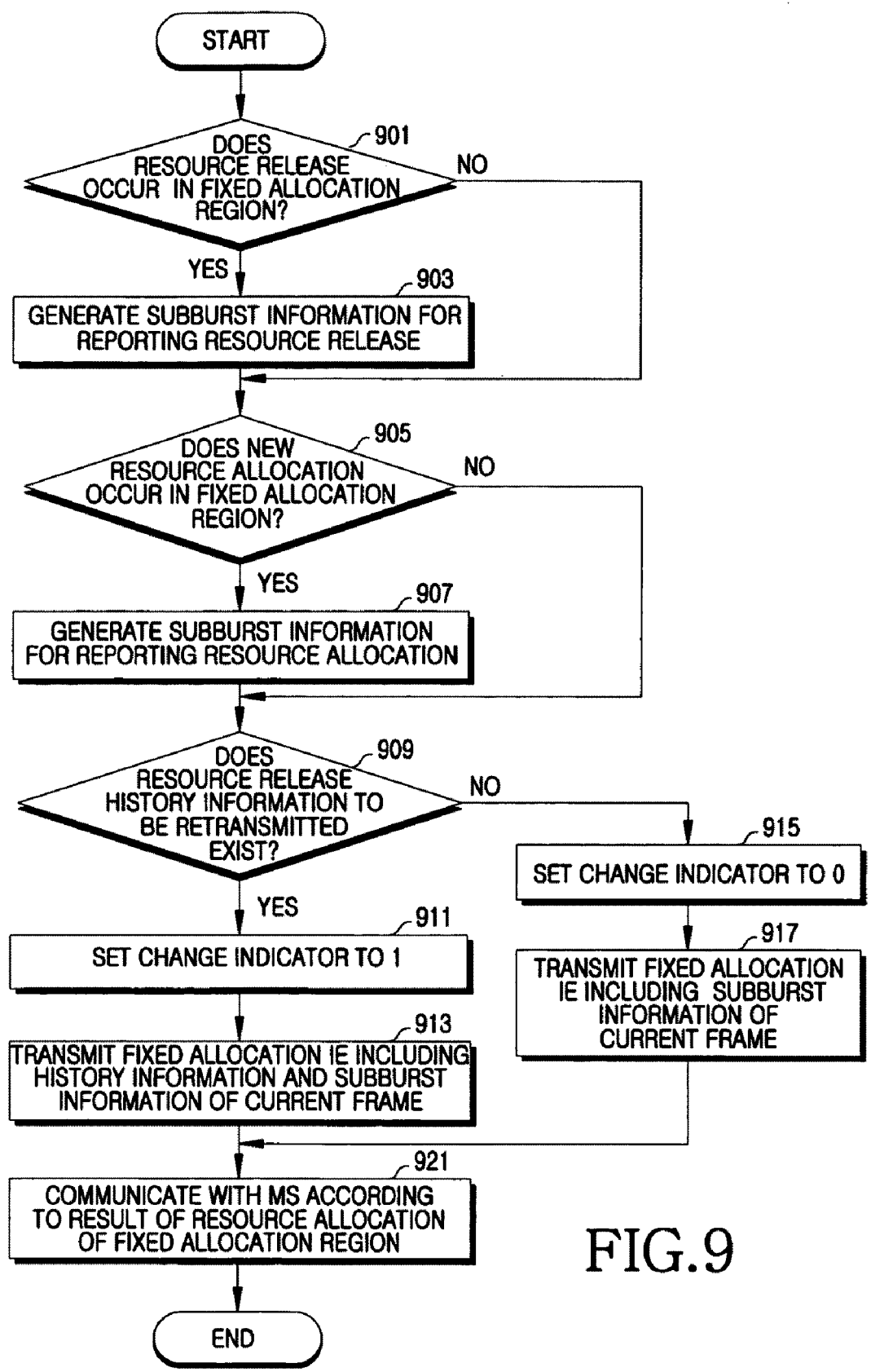
FIG. 9 is a flowchart illustrating an operation of a BS in a broadband wireless communication system according to a second exemplary embodiment of the present invention.

FIG. 9 is a flowchart illustrating an operation of a BS in a broadband wireless communication system according to a second exemplary embodiment of the present invention. In FIG. 9, the BS performs communication using a fixed allocation region in one frame.

Referring to FIG. 9, the BS determines whether resources are released in a fixed allocation region in step 901. If resource release or change does not occur in the fixed allocation region of a current frame, the procedure proceeds to step 905.

If resource release occurs in the fixed allocation region at the current frame, proceeding to step 903, the BS generates subburst information for reporting resource release. The subburst information for reporting resource release includes at least one of a CID of an MS allocated with a resource to be released, a start offset and duration of the resource to be released, and a retransmission flag which is set to 0.

In step 905, the BS determines whether new resource allocation occurs in the fixed allocation region at the current frame. If the new resource allocation does not occur in the fixed allocation region at the current frame, the procedure proceeds to step 909.

If the new resource allocation occurs in the fixed allocation region at the current frame, proceeding to step 907, the BS generates subburst information for reporting resource allocation. The subburst information for reporting resource allocation includes at least one of a CID of an MS to be allocated with a resource, a flag for distinguishing fixed allocation and general allocation, a start offset and duration of the resource to be allocated, and HARQ NACK channel related information.

In step 909, the BS determines whether history information regarding resource release at the current frame has to be transmitted. That is, the BS determines whether resource release occurs at a frame corresponding to a previous fixed allocation period. The determination on retransmission of the history information is achieved differently according to specific exemplary embodiments of the present invention. For example, the history information may be continuously transmitted a predetermined number of times or may be transmitted at the request of an MS. In addition, the history information may be continuously retransmitted a predetermined number of times without the request and may be retransmitted at the request.

If the history information to be retransmitted exists, proceeding to step 911, the BS sets a change indicator to 1, wherein the change indicator is to be transmitted at the current frame. The change indicator is information for indicating whether resource release occurs at a frame corresponding to a previous fixed allocation period. The change indicator is included in the fixed allocation IE.

After setting the change indicator to 1, proceeding to step 913, the BS transmits the fixed allocation IE. The fixed allocation IE includes history information and subburst information for the current frame. The fixed allocation IE further includes at least one of the change indicator which is set to 1, a size of the fixed allocation IE, a CID type of an MS, and fixed allocation region information. The history information includes at least one of a CID of an MS allocated with a resource to be released, a start offset and duration of the resource to be released, and a retransmission flag which is set to 1.

If there is no history information to be retransmitted in step 909, proceeding to step 915, the BS sets the change indicator to 0, wherein the change indicator is to be transmitted at the current frame. The change indicator is information for indicating whether resource release occurs at frame corresponding to a previous fixed allocation period. The change indicator is included in the fixed allocation IE.

After setting the change indicator to 0, proceeding to step 917, the BS transmits the fixed allocation IE including subburst information of the current frame. The fixed allocation IE further includes at least one of the change indicator which is set to 0, a size of the fixed allocation IE, a CID type of an MS in use, and fixed allocation region information.

After transmitting the fixed allocation IE, proceeding to step 921, the BS communicates with the MS according to a result of resource allocation of the fixed allocation region. In this case, the BS adjusts locations of resources allocated to the MS by using an implicit resource shifting scheme when resource release or change occurs.

Figure 10:
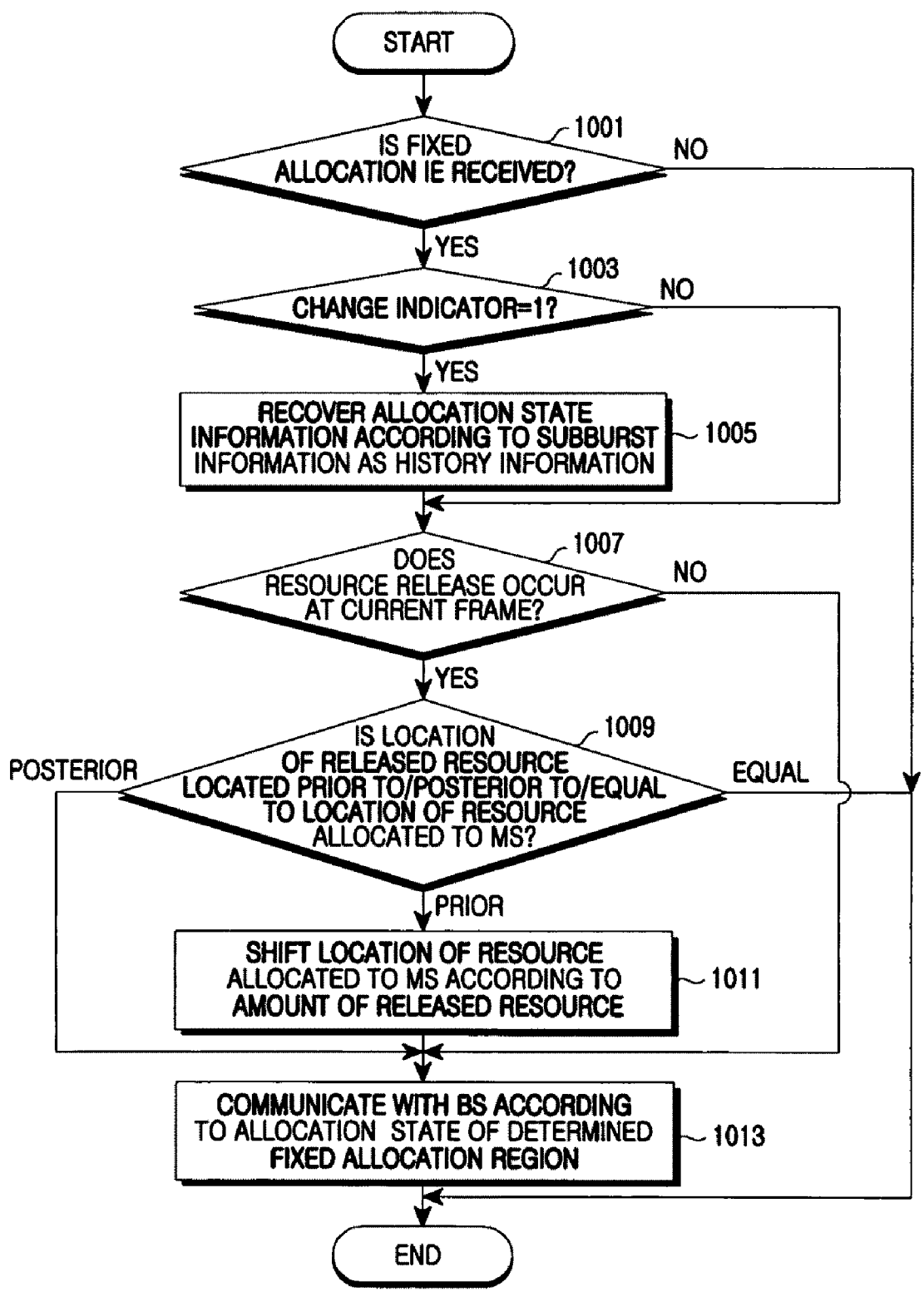
FIG. 10 is a flowchart illustrating an operation of an MS in a broadband wireless communication system according to a second exemplary embodiment of the present invention.

FIG. 10 is a flowchart illustrating an operation of an MS in a broadband wireless communication system according to a second exemplary embodiment of the present invention. In FIG. 10, the MS performs communication using a fixed allocation region in one frame. It is assumed herein that a MAP message is received unsuccessfully in a previous fixed allocation period.

Referring to FIG. 10, the MS determines whether a fixed allocation IE is received in step 1001. That is, the MS determines whether an error is detected as a result of a CRC of a signal extracted from a MAP message region of the frame. If a fixed allocation IE is unsuccessfully received, the procedure of FIG. 10 ends. The fixed allocation IE further includes at least one of the change indicator, a size of the fixed allocation IE, a CID type of the MS in use, fixed allocation region information, subburst information, and history information.

On the other hand, upon receiving the fixed allocation IE, proceeding to step 1003, the MS evaluates a value of the change indicator included in the fixed allocation IE. That is, the MS determines whether resource release occurs at a frame corresponding to a previous fixed allocation period in which the receiving of the MAP message failed. If the change indicator is 0, the procedure proceeds to step 1007.

If the change indicator is 1, proceeding to step 1005, the MS recognizes that a resource release occurred at a frame corresponding to a previous fixed allocation period, and then recovers allocation state information according to subburst information as history information. In this case, by considering a retransmission flag, the MS distinguishes the subburst information between the history information and the subburst information of the current frame. More specifically, by considering the retransmission flag included in the subburst information, the MS determines whether the subburst information is the history information, and recovers the allocation state information according to the subburst information determined to be the history information (that is, according to the subburst information including the retransmission flag, which is set to 1).

In step 1007, the MS determines whether resource release occurs at the current frame. That is, the MS determines whether the subburst information for reporting release exists, wherein the subburst information includes the retransmission flag, which is set to 0. If the resource release does not occur, the procedure proceeds to step 1013.

If resource release occurs, proceeding to step 1009, the MS compares a location of a released resource with a location of a resource allocated to the MS by using start point information included in the subburst information for reporting resource release. That is, the MS determines whether the resource release that occurs at the current frame has an effect on the location of the resource allocated to the MS. If the location of the released resource is posterior to the location of the resource allocated to the MS, the procedure proceeds to step 1013. Otherwise, if the location of the released resource is equal to the location of the resource allocated to the MS (that is, the released resource is the resource allocated to the MS), the procedure of FIG. 10 ends.

If the location of the released resource is prior to the location of the resource allocated to the MS, proceeding to step 1011, the MS shifts the location of the resource allocated to the MS according to a size of the released resource. That is, the MS excludes the released resource from the allocation state information, and shifts the location of the resource allocated to the MS forward by the size of the released resource. Accordingly, the MS updates the allocation state information. If a plurality of pieces of subburst information for reporting resource release exists, the MS repeats steps 1009 to 1011 according to subburst information for reporting resource release.

In step 1013, the MS communicates with the BS according to the allocated state of the determined fixed allocation region. In other words, the MS transmits or receives signals by using the resource allocated to the MS.

According to exemplary embodiments of the present invention, change report information indicating release or change of resources in a fixed allocation region and history information regarding resource release or change are delivered from a BS to an MS. Therefore, even if the MS unsuccessfully receives a MAP message, the MS can recover allocation state information of the fixed allocation region without the aid of other elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station (BS) apparatus in a wireless communication system using a fixed allocation scheme, the apparatus comprising:
a controller configured to configure a change report information to report an occurrence of a resource release or change when resources are released or changed in a fixed allocation region;
a generator configured to generate a fixed allocation information element (IE) comprising the change report information and a history information regarding the resource release or change; and
a transmitter configured to transmit the fixed allocation information element.

2. The apparatus of claim 1, wherein the transmitter is further configured to continuously transmit the history information a predetermined number of times upon the occurrence of the resource release or change.

3. The apparatus of claim 1, wherein the transmitter is further configured to transmit the history information at the request of a mobile station (MS).

4. The apparatus of claim 1,
wherein the change report information is a counter variable which is incremented when resources are released or changed, and
wherein the generator is further configured to generate the fixed allocation information element comprising at least one of an identifier of the fixed allocation region, the number of fixed allocated resources, the number of occurrences of resource allocation at a current frame, the number of occurrences of resource release or change at a current frame, the counter variable, a start point of a new allocation, a new resource allocation information, and a resource release or change information.

5. The apparatus of claim 4, wherein the generator is further configured to indicate released or changed resource identification information by using a relative rank included in the fixed allocation region when generating the resource release or change information.

6. The apparatus of claim 1,
wherein the change report information is a change indicator which is set to 1 when resources within the fixed allocation region are released or changed at one period before a current frame, and
wherein the generator is further configured to generate the fixed allocation information element comprising at least one of the change indicator, a size of the fixed allocation information element, a connection identifier (CID) type of a mobile station in use, a location and size information of the fixed allocation region, an identifier of the fixed allocation region, a subburst information as the history information, and a subburst information for reporting a resource allocation or release that occurs at a current frame.

7. The apparatus of claim 6, wherein the generator is further configured to generate the subburst information comprising at least one of a connection identifier of a mobile station allocated with a released resource, a start offset and duration of a released resource, a retransmission flag for indicating history information, and a flag for distinguishing a fixed allocation and a general allocation.

8. The apparatus of claim 6,
wherein the generator is further configured to generate the subburst information for reporting a resource allocation, and the subburst information comprises at lease one of a connection identifier of a mobile station to be allocated with the resource, a flag for distinguishing a fixed allocation and a general allocation, and a start offset and duration of the resource to be allocated when resource allocation occurs, and
wherein, the generator is further configured to generate the subburst information for reporting a resource release, and the subburst information comprises at least one of a connection identifier of a mobile station to which a resource to be released has been allocated, a start offset and duration of a resource to be released, and a flag for distinguishing a fixed allocation and a general allocation when resource release occurs.

9. A mobile station (MS) apparatus in a wireless communication system using a fixed allocation scheme, the apparatus comprising:
a receiver configured to receive a fixed allocation information element (IE);
an analyzer configured to evaluate a change report information included in the fixed allocation information element; and
a controller configured to determine a presence or an absence of a history information regarding an unconsidered resource release or change according to the change report information and recover an allocation state information of a fixed allocation region by using the history information.

10. The apparatus of claim 9,
wherein the change report information is a counter variable that is incremented according to resource release or change, and
wherein the analyzer is further configured to analyze the fixed allocation information element to evaluate at least one of an identifier of the fixed allocation region, the number of fixed allocated resources, the number of occurrences of resource allocation at a current frame, the number of occurrences of a resource release or change at the current frame, the counter variable, a start point of a new allocation, a new resource allocation information, and a resource release or change information.

11. The apparatus of claim 10, wherein the controller is further configured to determine whether a location of a resource allocated to the mobile station has changed by comparing a released or changed resource rank included in the resource release or change information with a rank of the resource allocated to the mobile station.

12. The apparatus of claim 9,
wherein the change report information is a change indicator which is set to 1 when resources within the fixed allocation region are released or changed at one period before a current frame, and
wherein the analyzer is further configured to analyze the fixed allocation information element to evaluate one of the change indicator, a size of the fixed allocation information element, a connection identifier (CID) type of a mobile station in use, a location and a size information of the fixed allocation region, an identifier of the fixed allocation region, a subburst information as the history information, and a subburst information for reporting a resource allocation or release that occurs at a current frame.

13. The apparatus of claim 12,
wherein the analyzer is further configured to analyze the subburst information for reporting a resource release to evaluate at least one of a connection identifier of a mobile station to which a resource to be released has been allocated, a start offset and duration of a resource to be released, and a flag for distinguishing a fixed allocation and a general allocation, and
wherein the controller is further configured to determine whether the subburst information for reporting a resource release is the history information by considering a retransmission flag.

14. The apparatus of claim 12, wherein the analyzer is further configured to analyze the subburst information for reporting a resource allocation to evaluate at least one of a connection identifier of a mobile station to be allocated with a resource, a flag for distinguishing a fixed allocation and a general allocation, and a start offset and duration of a resource to be allocated.

15. The apparatus of claim 9, wherein the controller is further configured to request a base station (BS) to transmit the history information when determining that history information regarding an unconsidered resource release or change exists.

16. A method of operating a base station (BS) apparatus in a wireless communication system using a fixed allocation scheme, the method comprising:
configuring a change report information to report an occurrence of a resource release or change when resources are released or changed in a fixed allocation region;
generating a fixed allocation information element (IE) comprising the change report information and a history information regarding the resource release or change; and
transmitting the fixed allocation information element.

17. The method of claim 16, wherein after the occurrence of a resource release or change, the history information is continuously transmitted a predetermined number of times.

18. The method of claim 16, wherein the history information is transmitted at the request of a mobile station (MS).

19. The method of claim 16,
wherein the change report information is a counter variable which is incremented when resources are released or changed, and
wherein the fixed allocation information element comprises at least one of an identifier of the fixed allocation region, the number of fixed allocated resources, the number of occurrences of resource allocation at a current frame, the number of occurrences of resource release or change at the current frame, the counter variable, a start point of a new allocation, a new resource allocation information, and a resource release or change information.

20. The method of claim 19, wherein the resource release or change information comprises released or changed resource identification information which is indicated using a relative rank information included in the fixed allocation region.

21. The method of claim 16,
wherein the change report information is a change indicator which is set to 1 when resources within the fixed allocation region are released or changed at one previous period, and
wherein the fixed allocation information element comprises at least one of the change indicator, a size of the fixed allocation information element, a connection identifier (CID) type of a mobile station in use, a location and size information of the fixed allocation region, an identifier of the fixed allocation region, a subburst information as the history information, and a subburst information for reporting a resource allocation or release that occurs at a current frame.

22. The method of claim 21, wherein generating the fixed allocation information element comprising the history information comprises generating the subburst information comprising at least one of a connection identifier of a mobile station allocated with a released resource, a start offset and duration of a released resource, a retransmission flag for indicating history information, and a flag for distinguishing a fixed allocation and a general allocation.

23. The method of claim 21, wherein generating the fixed allocation information element comprises:
upon an occurrence of a resource allocation, generating a subburst information for reporting the resource allocation, the subburst information comprising at lease one of a connection identifier of a mobile station to be allocated with the resource, a flag for distinguishing a fixed allocation and a general allocation, and a start offset and duration of a resource to be allocated; and
upon an occurrence of a resource release, generating a subburst information for reporting the resource release, the subburst information comprising at least one of a connection identifier of a mobile station to which the resource to be released has been allocated, a start offset and duration of the resource to be released, and a flag for distinguishing a fixed allocation and a general allocation.

24. A method of operating a mobile station (MS) apparatus in a wireless communication system using a fixed allocation scheme, the method comprising:
receiving a fixed allocation information element (IE);
determining a change report information included in the fixed allocation information element;
determining a presence or an absence of a history information regarding an unconsidered resource release or change according to the change report information; and
recovering an allocation state information of a fixed allocation region by using the history information.

25. The method of claim 24,
wherein the change report information is a counter variable which is incremented when resources are released or changed, and
wherein the fixed allocation information element comprises at least one of an identifier of the fixed allocation region, the number of fixed allocated resources, the number of occurrences of resource allocation at a current frame, the number of occurrences of resource release or change at a current frame, the counter variable, a start point of a new allocation, a new resource allocation information, and a resource release or change information.

26. The method of claim 25, further comprising determining whether a location of a resource allocated to the mobile station has changed by comparing a released or changed resource rank included in the resource release or change information with a rank of the resource allocated to the mobile station.

27. The method of claim 24,
wherein the change report information is a change indicator which is set to 1 when resources within the fixed allocation region are released or changed at one previous period, and
wherein the fixed allocation information element comprises at least one of the change indicator, a size of the fixed allocation information element, a connection identifier (CID) type of a mobile station in use, a location and size information of the fixed allocation region, an identifier of the fixed allocation region, a subburst information as the history information, and a subburst information for reporting a resource allocation or release that occurs at a current frame.

28. The method of claim 27, further comprising:
by analyzing the subburst information for reporting a resource release, evaluating at least one of a connection identifier of a mobile station to which the resource to be released has been allocated, a start offset and duration of the resource to be released, and a flag for distinguishing a fixed allocation and a general allocation, and determining whether the subburst information for reporting a resource release is the history information.

29. The method of claim 28, further comprising, by analyzing the subburst information for reporting a resource allocation, evaluating at least one of a connection identifier of a mobile station to be allocated with the resource, a flag for distinguishing a fixed allocation and a general allocation, and a start offset and duration of the resource to be allocated.

30. The method of claim 24, further comprising, when it is determined that an unconsidered resource release or change exists in the history information, requesting a base station (BS) to transmit the history information.

* * * * *